United States Patent [19]

Kepler

[11] 4,194,528
[45] Mar. 25, 1980

[54] SPHERICAL VALVE SEAL PISTON DETECTING AND LOCKING ARRANGEMENT

[75] Inventor: James L. Kepler, York, Pa.

[73] Assignee: Allis-Chalmers Corporation, Milwaukee, Wis.

[21] Appl. No.: 897,188

[22] Filed: Apr. 17, 1978

[51] Int. Cl.² .............................................. F16K 43/00
[52] U.S. Cl. .................................. 137/554; 251/164; 251/188; 251/172; 251/315
[58] Field of Search ............... 251/161, 164, 188, 307, 251/172, 315; 137/553, 554

[56] References Cited

U.S. PATENT DOCUMENTS

| | | | |
|---|---|---|---|
| 2,653,004 | 9/1953 | Schnyder | 251/172 |
| 2,857,130 | 10/1958 | Brisbane | 251/175 |
| 2,950,896 | 8/1960 | Buttiker | 137/613 |
| 3,007,490 | 11/1961 | Passmore | 251/172 |
| 3,013,766 | 12/1961 | Dawson | 251/172 |
| 3,037,738 | 6/1962 | Jackson | 251/188 |
| 3,067,978 | 12/1962 | Natho | 251/172 |
| 3,077,902 | 2/1963 | Vickery | 251/172 |
| 3,260,496 | 7/1966 | Borcherdt | 251/307 |
| 3,398,763 | 8/1968 | Richards | 251/172 |
| 3,532,320 | 10/1970 | Fisch | 251/175 |
| 3,583,670 | 6/1971 | Manske | 251/307 |
| 3,653,631 | 4/1972 | Hurst | 251/161 |
| 3,837,357 | 9/1974 | Slaughter | 137/554 |
| 3,901,474 | 8/1975 | Kubota | 251/188 |
| 4,006,883 | 2/1977 | Hilsheimer | 251/188 |
| 4,044,995 | 8/1977 | Kubota | 251/161 |
| 4,084,608 | 4/1978 | Laignel et al. | 137/316 |

FOREIGN PATENT DOCUMENTS

| | | | |
|---|---|---|---|
| 1550204 | 4/1970 | Fed. Rep. of Germany | 251/307 |
| 2524895 | 12/1975 | Fed. Rep. of Germany | 251/307 |
| 2632397 | 1/1978 | Fed. Rep. of Germany | 251/172 |
| 2271471 | 5/1974 | France | 137/553 |

Primary Examiner—William R. Cline
Assistant Examiner—H. Jay Spiegel
Attorney, Agent, or Firm—Robert C. Jones

[57] ABSTRACT

A housing in which a locking tube is contained is threaded into a suitable threaded opening in the valve casing with the opening communicating with the interior of the casing adjacent the seal piston; the locking tube is threaded within the housing and is engageable with the seal piston to lock the seal piston against the valve insuring positive sealing engagement; a detector push-rod is axially movable within the locking tube and is spring loaded against the seal piston; when sealing has been effected, the push-rod effects the actuation of a limit switch to initiate the operation of a signal device.

4 Claims, 3 Drawing Figures

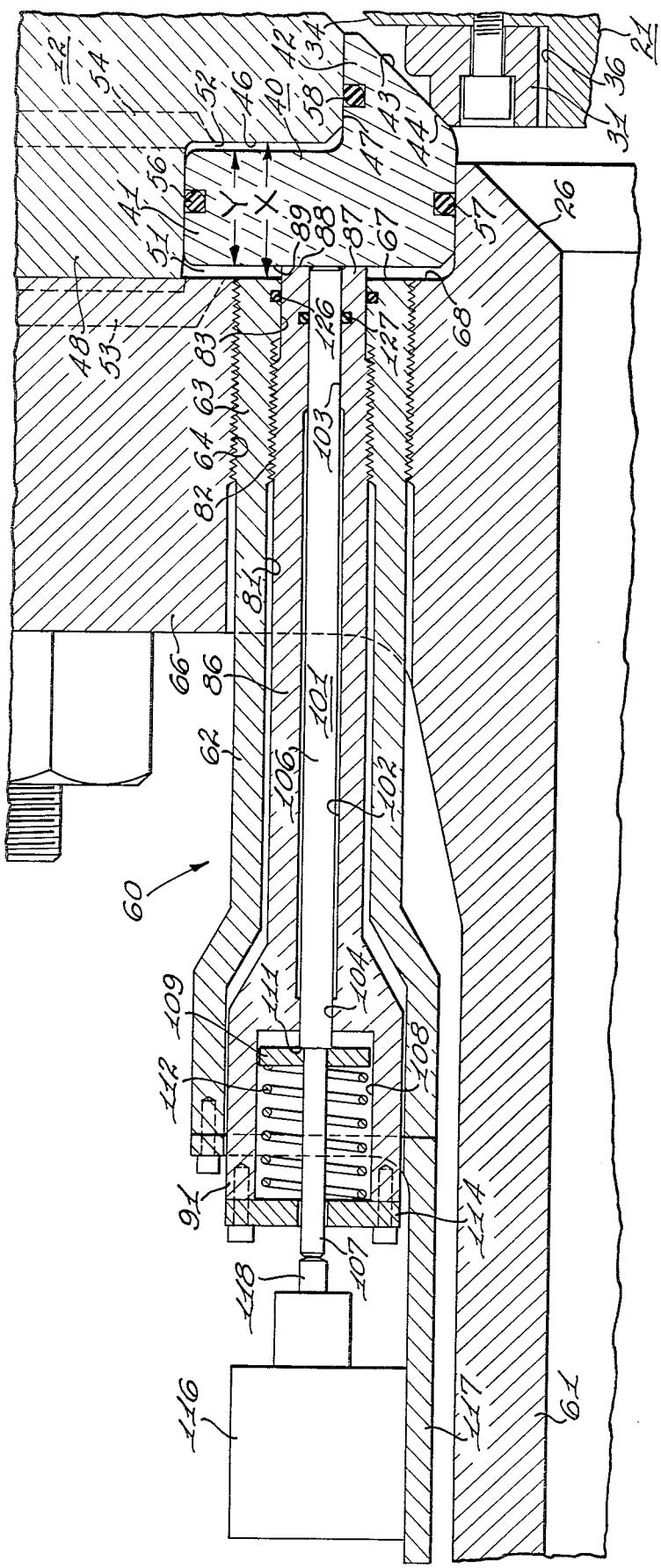

SPHERICAL VALVE SEAL PISTON DETECTING AND LOCKING ARRANGEMENT

BACKGROUND OF THE INVENTION

This invention pertains generally to valves and more particularly to valves having a double seal element so that each seal can be utilized to block the flow of fluid through the valve.

In more particularity, the invention relates to the seal pistons of spherical valves in which the installation handles large volumes of fluid such as is usual in hydraulic turbine installations.

Large spherical valves have a rotor which is rotatably disposed within the valve body for positioning movement between open and closed positions. Normally one seal element is on the rotor and the other cooperating seal element is on the valve body. In spherical valves, a fluid passageway is provided in the rotor with its axis displaced 90 degrees of the axis of the rotor seal element. The rotor is positionable to align the passageway therein with the fluid passageway through the valve body to permit fluid flow through the valve. Positioning movement of the rotor to a closed position displaces the rotor fluid passageway to block the flow of fluid flow through the valve. This movement also aligns the rotor seal element with the valve body seal element to prevent leakage of the fluid around the rotor.

The rotating of the rotor between open and closed positions causes wear to occur on the seal elements. Also, grit matter in the down rushing water flow causes wear on the seal. Whatever the cause of wear, the downstream seal must be periodically serviced. In order to serve the downstream seal elements, it is necessary to provide upstream seal elements which are effected in preventing fluid leakage around the rotor. However, it has been found that the frictional engagement between the rotor sealing elements and valve casing sealing element is not sufficient to prevent fluid leakage around the rotor. Also, due to requirements by OSHA safety factors must be provided to insure positive sealing engagement between sealing elements.

Prior art presently known which attempted to provide some forms of forceful engagement between the sealing elements are exemplified in U.S. Pat. No. 3,532,320 which provides auxiliary sealing elements which interrupt the flow of fluid while the normal sealing elements are being serviced. This patent teaches the utilization of sealing elements on the rotor with one or the other of the valve casing sealing elements. U.S. Pat. No. 3,077,902 teaches the utilization of a spring clip to urge the sealing element into sealing engagement with the rotor. U.S. Pat. No. 3,067,978 teaches the utilization of line pressure from the upstream side to force the upstream seat into engagement with the surface of rotor. The construction of the seal is in the form of a wedge and the pressure forces the seal member towards the apex of the wedge. U.S. Pat. No. 3,013,766 teaches the use of a movable downstream sealing ring adapted to be moved into engagement with a seal ring. The sealing ring is in the form of a piston and fluid pressure utilized to move the sealing ring into or out of engagement with the seal ring. Also shown is an upstream arrangement which is similar to the downstream sealing arrangement. Associated with the upstream sealing arrangement is a fluid actuated sensing device which follows the sealing piston and gives exterior indication of the sealing piston position. Other U.S. patents which teach the utilization of fluid pressure to move a sealing ring into engagement with a rotor seal are U.S. Pat. Nos. 3,007,490; 2,950,896; 2,857,130 and 2,653,004.

However, none of the known prior art teaches of providing a positive mechanical locking means for the sealing piston for positively locking the sealing piston in sealing engagement with the valve rotor. The invention herein disclosed contemplates a novel method for effecting a positive locking of the sealing piston in sealing engagement with the valve rotor and discloses a novel means for practicing the method. In addition, a detecting means is incorporated to sense the position of the sealing piston which is also mechanical in nature.

DESCRIPTION OF THE INVENTION

Figure 1:
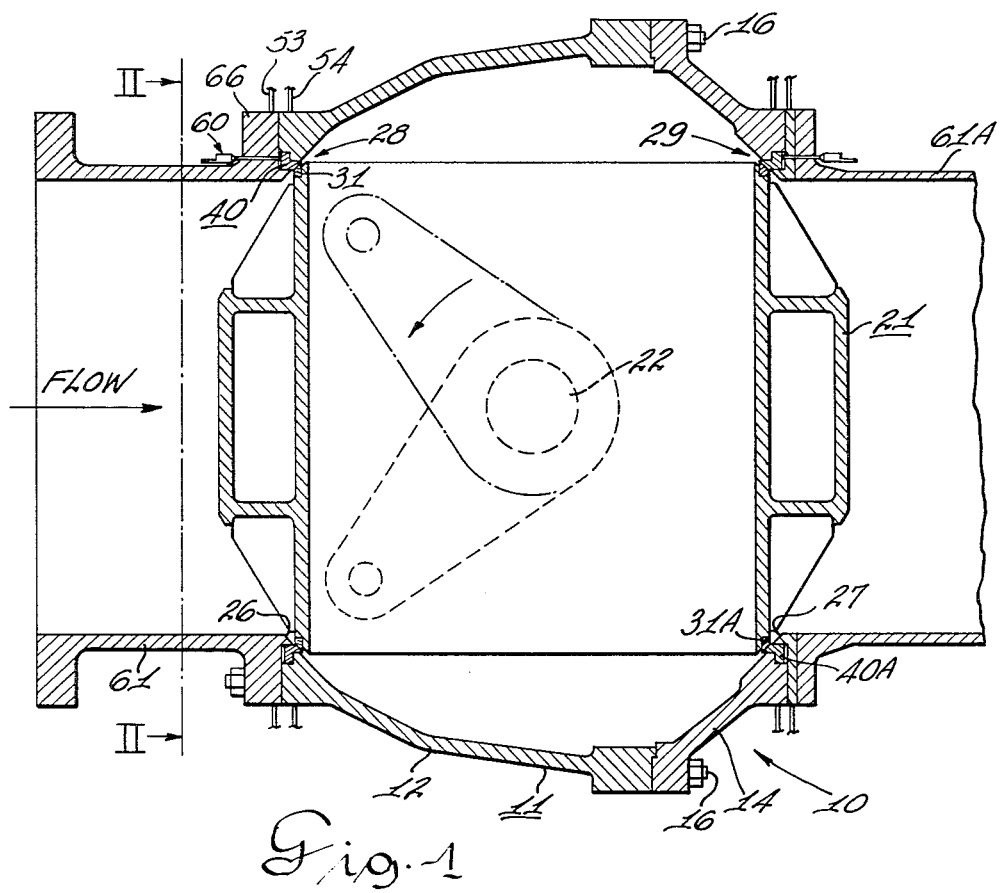
FIG. 1 is a view in vertical section through a rotary valve taken along the flow axis of the valve.
Figure 2:
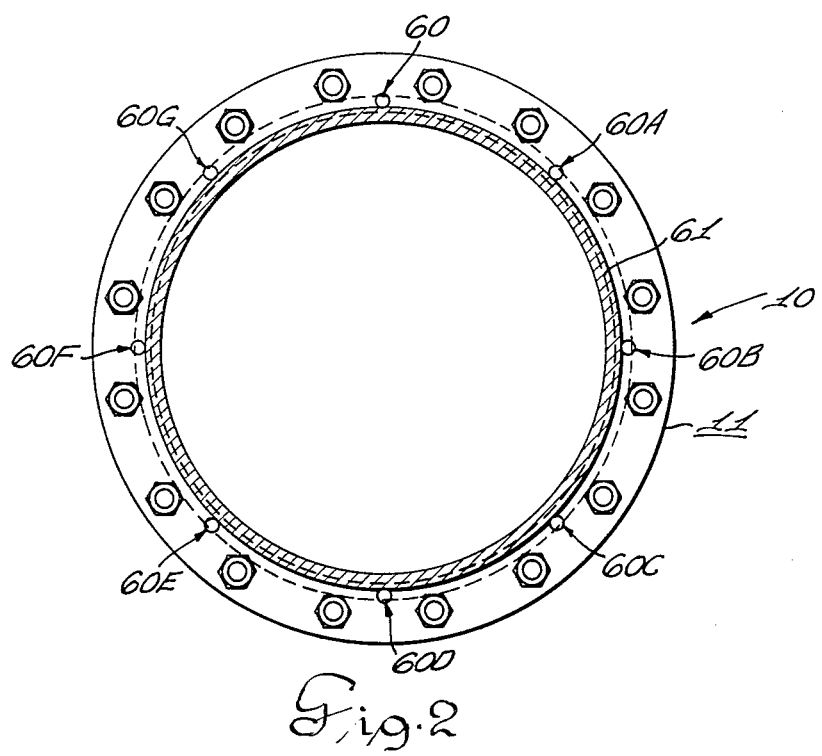
FIG. 2 is a view in transverse section through the upstream inlet pipe taken in a plane represented by the line II—II in FIG. 1 showing the relative location of one of the locking means on the upstream and downstream side of the valve; and, FIG. 3 is an enlarged view in section through the locking means and the valve casing and showing its relationship to the sealing piston.

Referring more particularly to FIG. 1, the invention herein disclosed is shown in cooperation with a spherical valve 10. The valve 10 includes a valve body or casing 11. The valve body 11 in this particular illustration is shown formed in an upstream portion 12 and a downstream portion 14 securely joined together by bolts 16. Within the valve body 11 is a valve rotor 21 having laterally oppositely extending stub shafts 22, one of which is depicted in FIG. 1, that are rotatably received within journal boxes (not shown) formed as portions of the upstream portion 12 of the valve body as is well known.

The valve body 11 has an upstream inlet flow passage 26 and a downstream outlet flow passage 27. Annular seal assemblies 28 and 29 are provided about the inlet and outlet openings, respectively, for effecting a fluid tight seal when the rotor 21 is positioned to block the flow of fluid through the valve. As shown, the inlet and outlet seal assemblies are identical and a description of the seal assembly 28 will also apply to the seal assembly 29.

As shown, the seal assembly 28 includes a seal seat 31 which is constructed as an annular ring surrounding a fluid passageway 34 formed in the rotor 21. The seal seat 31, as more clearly depicted in FIG. 3, is disposed within an annular groove 36 formed at the end of the rotor 21 around the outer tapered circumference thereof. With the rotor in closed position, as depicted in FIGS. 1 and 3, the seal seat 31 is adapted to be engaged by a movable annular seal piston 40 which is operative to prevent fluid leakage around the rotor 21. As depicted, the annular seal piston 40 has an annular body portion 41 and an inner axially extending nose portion 42 which is arranged to engage with the seal seat 31. To this purpose, the inner edge portion of the nose 42 is beveled as at 43 to provide a compatible surface to cooperate with the very slightly arc portion 44 of the seal seat 31.

Effecting engagement of the seal piston 40 with the seal seat 31 is accomplished by fluid pressure. To this purpose the seal pistons body portion 41 is disposed within an annular groove 46 formed in the inner circumferential surface 47 of a flange portion 48 of the upstream casing portion 12. The dimension X of the groove 46 is larger than the Y dimension of the seal piston body 41. With this arrangement, fluid chambers 51 and 52 are formed on each side of the body 41. Fluid under pressure from a source (not shown) is selectively admitted to the chambers 51 and 52 via fluid passages 53 and 54, respectively.

With the rotor 21 in the closed position, as depicted in FIG. 1, the passage 54 will be connected so as to exhaust the chamber 52 and passage 53 will be connected to the source of fluid under pressure to thereby move the seal piston rightwardly, as viewed in FIG. 3, into engagement with surface 44 of the sealing seat 31. O-rings 56, 57 and 58 are utilized in a well known manner to prevent fluid leakage around the sealing piston.

When the downstream seals 31A and 40A, which normally operate to seal the valve in normal valve operation, are in need of servicing the upstream seal seat 31 and the seal piston 40 are operated to positively seal the fluid from flowing around the rotor 21. This is also true when servicing other apparatus on the downstream side of the valve. However, in these situations the engagement of the seal piston 40 with the seal seat 31 by operation of fluid pressure is not enough of a positive action to insure the safety of personnel working within the valve itself or on apparatus downstream of the valve.

To insure a positive locking of the seal piston 40 in fluid sealing position relationship with the rotor seal seat 44, a plurality of mechanical seal piston locks 60 are provided. In the particular illustration, the number of the positive mechanical locks are herein shown as eight in number and are located circumferentially around an inlet pipe 61. For the purpose of this disclosure, the inlet pipe 61, as well as a pipe 61A associated with the outlet side of the valve, can be considered as parts of the housing 11. The seal piston locking device 60 is identical and the description of the device 60 will apply to all such devices.

As best shown in FIG. 3, the seal piston lock 60 includes a tubular housing 62 having an externally threaded nose portion 63 which threadedly engages in a threaded bore 64 formed in the radial flange 66 of the inlet pipe 61. It is preferred that the tubular housing 62 be of stainless steel so as to be as noncorrosive as possible. It is also contemplated that the housing 62, once inserted into operating position, will be more or less permanent, removal not being contemplated. The bore 64 is formed so as to communicate with the chamber 51. Thus, the housing 62 inserted into the bore 64 the full depth of the bore where the axial end face 67 is substantially flush with the inner face 68 of the flange 66 that forms one wall of the chamber 51. The housing 62 is formed with an axial bore 81 having a threaded forward portion 82 that terminates at a reduced bore portion 83. The bore 81 is constructed to receive an elongated stainless steel tube or barrel 86 which has a pilot end 87. The pilot end 87 of the barrel 86 is adapted to be received within the reduced bore portion 83 of the housing 62. As is shown in FIG. 3, the length of the pilot end 87 of the barrel is sufficiently long to permit the barrel 86 to be threaded further into the bore 81 so as to position the axial end face 88 firmly against the facing surface 89 of the seal piston 40 to effectively mechanically lock the seal piston 40 in tight fluid sealing engagement with the seal seat 31. This is accomplished by manually rotating the barrel by applying a tool to the enlarged squared end 91 formed at the outer end of the barrel.

Advantage has been taken of the locking device 60 arrangement to provide a relatively simple seal piston position detecting device 101. To this purpose, the barrel 62 is formed with an axial bore 102 having reduced inner and outer guide or bearing portions 103 and 104, respectively. A stainless steel elongated rod 106 is slideably disposed within the barrel bore 102 and is arranged so that its outer end 107 extends outwardly of the bore 102 into and through a cylindrical chamber 108 formed in the enlarged end 91 of the barrel. A disc 109 is mounted on reduced portion 107 of the rod and abuts the shoulder 111 formed by the reduced portion and the main body of the rod. A compression spring 112 is disposed about the end of the reduced portion of the rod 106 and abuts the disc 109. To maintain the spring 112 under compression within the chamber 108, a cover plate 114 having an axial opening through which the reduced end portion of the rod 106 extends is screw fastened to the enlarged end 91 of the barrel 86. Thus, the rod 106 is constantly biased rightwardly or inwardly, as viewed in FIG. 3, against the seal piston 40 and constantly follows the seal piston. The outer extending end of the rod 106 may be utilized to actuate a visual signal device to indicate the position of the seal piston or, as herein depicted, is associated with a switch 116. The switch 116 is mounted on an L-shaped bracket 117 which is screw fastened to the enlarged end of housing 62. In this showing, the actuating plunger 118 of the switch 116 is in axial alignment with the rod 106 and follows the end of the rod. Thus, with barrel 86 in a rightward locking engagement with the seal piston 40, the spring 112 tends to be compressed. This causes the spring to exert a rightwardly acting force on the rod 106 so that it follows the seal piston. As the rod 106 is moved rightwardly, as viewed in FIG. 3, the actuating plunger 118, which is spring loaded as is well known, moves rightwardly to a normal rightward position wherein internal contacts (not shown) are made to establish an electrical circuit (not shown) to initiate a visual or audio indicating signal to indicate that the seal piston 40 is locked in tight fluid sealing engagement with the seal seat 31 of the rotor. On the other hand, when the barrel 86 is rotated so as to effect outward or leftward movement of the barrel to release its locking effect on the seal piston 40, the force applied on the spring 112 is released. This permits the rod 106 to be moved leftward, as viewed in FIG. 3, by the outward or leftward movement of the seal piston to a nonsealing position. Under this condition, the rod 106 actuates the plunger 118 of the switch 116 to interrupt the audio or visual indicating circuit. However, the operational arrangement of the switch is optional and can be wired to complete circuits as desired.

As shown, sealing means in the form of O-rings 126 and 127 are provided to prevent leakage of fluid from the chamber 51 through the joint surface between the guide bore 83 and the pilot end 87 of the locking rod and also between the detecting rod 106 and the bore 103 of the locking rod.

The embodiments of the invention in which an exclusive property or privilege is claimed are defined as follows:

1. A spherical valve including a housing having a fluid inlet and a fluid outlet, and provided with an annular groove surrounding said fluid inlet;

a rotor rotatably supported within said housing, said rotor having a fluid flow passage therein for selective alignment with the inlet and outlet of housing to permit fluid through the housing;

a first seal element on the rotor;

a second seal element movably carried by said housing within said annular groove and adapted to be selectively engaged with the first seal element on the rotor when the rotor is in a position wherein the fluid flow passage is not interconnecting the inlet and outlet of the housing, the engagement of said second seal element with said first seal element operating to block fluid flows, said second seal element being movably disposed within said annular groove and constructed and arranged to form a first fluid chamber on one side thereof, said first chamber when pressurized operating to move said second seal element out of sealing engagement with said first seal element, and a second fluid chamber on the opposite of said second seal element and operable when pressurized to effect movement of said second seal element into fluid sealing engagement with said first seal element;

means for supplying fluid under pressure to said first and said second chambers selectively;

a tubular locking member defining an axial bore movable into and out of positive engagement with said second seal element, said locking member when in engagement with said second seal element operating to positively lock said second seal element in sealing engagement with said first seal element; said locking member having an axial bore therethrough, said locking number having a pilot end portion and a threaded portion adjacent to and inwardly of the pilot end portion;

a threaded bore in said valve housing in communication with said second fluid chamber, said bore having a cylindrical guide portion adjacent the inner axial end of the said bore;

tool accepting means on the external end of said locking member to facilitate the manipulation of the said locking member into and out of locking engagement with said second seal element; and, fluid sealing means operable between the cylindrical guide surface of said bore and the pilot end of said locking member.

2. A spherical valve according to claim 1 wherein there is provided an elongated cylindrical housing having an axial bore, said housing having one end provided with external threads adapted to interengage in the threaded bore of said valve housing, said cylindrical housing being constructed and arranged to removably receive said tubular locking member for movement into and out of mechanical locking engagement with said second seal element.

3. A spherical valve according to claim 2 wherein there is also provided a chamber in the external end of said locking member;

the axial bore in said locking member communicating with said chamber thereof and said second fluid chamber associated with said second seal element;

a detecting rod carried with the bore of said locking member for axial movement and having its outer one end extending through said chamber in the external end of said locking member;

spring means confined within said chamber of said locking member and operably connected to urge said detecting rod in a first direction into positive engagement with said second seal element; and, signal means carried by said cylindrical housing in position to be actuated by said detecting rod, said signal means being operated by the position of said detecting rod to produce a first signal when said second seal element is in locked sealing engagement with said first seal element, said signal means also being operated by the position of said detecting rod when said second seal element is not in locked sealing engagement with said first seal.

4. A spherical valve according to claim 3 wherein said cylindrical housing, said locking member and said detecting rod are all constructed from a stainless steel material.

* * * * *